United States Patent [19]

Duperray et al.

[11] Patent Number: 5,019,444
[45] Date of Patent: May 28, 1991

[54] POLYVINYLIDENE FLUORIDE PRODUCTS WITH A SURFACE ADAPTED TO ADHERE TO AN INCOMPATIBLE POLYMER AND PROCESS FOR TREATING THE SURFACE OF A POLYVINYLIDENE FLUORIDE MATERIAL TO ENABLE IT TO ADHERE TO AN INCOMPATIBLE POLYMER

[75] Inventors: Gilbert Duperray, Civrieus D'Azergues; Daniel Wolff, Lyon, both of France

[73] Assignee: Atochem, France

[21] Appl. No.: 361,267

[22] Filed: Jun. 5, 1989

[30] Foreign Application Priority Data

Jun. 9, 1988 [FR] France .................... 8807696

[51] Int. Cl.$^5$ .............. B32B 5/16; B32B 27/08; B05D 3/08
[52] U.S. Cl. .................... 428/262; 427/223; 427/316; 427/421; 428/327; 428/339; 428/421
[58] Field of Search ............... 428/421, 262, 339, 327; 427/421, 223, 316

[56] References Cited

FOREIGN PATENT DOCUMENTS 1517594  7/1978  United Kingdom ............. 428/421
1526384  9/1978  United Kingdom ............. 428/421

*Primary Examiner*—Thomas J. Herbert
*Attorney, Agent, or Firm*—Sigalos, Levine & Montgomery

[57] ABSTRACT

A polyvinylidene fluoride product having at least one surface with improved adhesion to an incompatible polymer, said at least one surface covered with a porous polyvinylidene fluoride layer adhered thereto without a bonding intermediate, the process of forming the polyvinylidene fluoride product, and laminates thereof with non-adherent polymers.

15 Claims, No Drawings

POLYVINYLIDENE FLUORIDE PRODUCTS WITH A SURFACE ADAPTED TO ADHERE TO AN INCOMPATIBLE POLYMER AND PROCESS FOR TREATING THE SURFACE OF A POLYVINYLIDENE FLUORIDE MATERIAL TO ENABLE IT TO ADHERE TO AN INCOMPATIBLE POLYMER

BACKGROUND OF THE INVENTION

The present invention pertains to a polyvinylidene fluoride (PVDF) product at least one of whose surfaces is coated with fine particles of PVDF. The present invention also pertains to the process for treating a PVDF surface consisting of coating it with PVDF particles to facilitate the subsequent adhesion of a polymer incompatible with the PVDF to the said surface. The process consists of attaching PVDF particles to the PVDF surface.

PVDF has been known for its resistance to chemical agents and its resistance to atmospheric factors. These properties have made it a material that is particularly suitable as a protective coating for materials that are characterized by good mechanical strength but are susceptible to chemical or atmospheric corrosion. For example, the use of PVDF as a protective layer for thermosetting resins has developed in the manufacture of corrosion resistant components (tanks, vessels, piping systems).

In contrast, the anti-adhesive properties of PVDF makes it use complicated. Means have been developed during the past few years to make possible its adhesion to other bodies, particularly to synthetic resins, directly in the form of finishing layers or in the form of adhesive primers. The synthetic adhesive primer issued, in particular, as an intermediate for coating metal parts with PVDF.

It was proposed in French Patent No. 2,346,426 that a fibrous substrate should be applied to the PVDF surface by means of a PVDF solution in an aprotic polar solvent to render a PVDF surface adhesive for any surface.

It was proposed in U.S. Pat. No. 3,723,234 and DE-OS No. 2,818,385 that the PVDF surface should be impregnated, in the hot state and under pressure, with fibers or fabric to create an adhesive surface for other polymers.

These industrially utilized processes have the disadvantage of associating with the final PVDF-polymer composite a foreign intermediate in the form of fibers or fabric, which is not always advantageous. For example, when these composites are used, it is necessary to remove the fibrous substrate over a certain width along the welding or fusion lines prior to any welding or fusing operation. One of the disadvantages of this operation is that nonadhesive zones or at least zones in which separation and corrosion will begin are created along the welding or fusion lines.

Another known method consists of adhering particles of an inorganic substance, such as alumina or silica, to the PVDF from a solution of PVDF in a solvent. A foreign intermediate that is unfavorable as before is thus again interposed between the PVDF and the substrate to be adhered, particularly at the junctions.

SUMMARY OF THE INVENTION

The present invention pertains to a PVDF product at least one of whose surfaces, essentially consisting of PVDF, is adapted for the adhesion of an incompatible polymer.

As was seen, it is not possible to adhere an incompatible synthetic polymer to a PVDF surface either directly in the hot state or in the form of a solution primer, without using an intermediate that is foreign to the two materials to be adhered.

The PVDF product according to the present invention is characterized in that it has at least one surface coated with a PVDF porous layer. This porous layer is preferably formed by a powder, dispersed and attached to the surface of the products, creates a porous adhesion enhancing layer enabling the incompatible polymer to be adhered to become attached, in the hot or crosslinkable state, or in the form of a solution in a solvent.

DETAILED DESCRIPTION

This porous layer is formed by elementary PVDF particles with a mean particle size larger than 50 microns and preferably smaller than 300 microns. To form as highly effective a porous layer as possible, it is recommended that the PVDF particle layer should contain the smallest possible amount of particles smaller than 30 microns. The layer of particles in the unordered and bulk form on the PVDF material surface must be thick enough to form a porous layer ensuring the attachment of the incompatible polymer to be adhered. The recommended particle layer thickness is between 200 and 1,000 microns, preferably close to 500 microns.

Usually any PVDF powders that are likely to coat the PVDF material surface can be used. They include, e.g., the particles obtained directly by drying a latex obtained by emulsion polymerization or suspension polymerization of vinylidene fluoride. However, a PVDF powder that has already been melted is preferably used, so that the particles have sufficient cohesion. Moreover, the structure of the PVDF particles is preferably irregular to create sufficient porosity in the adhesion-enhancing layer. Thus, while having the most homogeneous particle size possible, the PVDF powder is preferably formed by particles of greatly diverse shapes. Such a powder is obtained, e.g., by cryogenic crushing of PVDF pellets.

The surface of the PVDF material coated with PVDF particles has a roughness that is noticeable by touch. It was observed that this surface roughness must be obtained by attaching particles to the surface of the material. In fact, it is possible to render a PVDF surface rough by mechanical treatment, e.g., by rasping, or by chemical treatment, which produces irregularities; strangely enough, these types of surface treatments have proven to be only moderately effective in terms of improvement of the adhesive properties of PVDF.

The process according to the present invention for the surface treatment of PVDF material to render it adhesive for an incompatible polymer consists of attaching PVDF particles to the said surface in the dispersed and bulk form. This treatment confers a roughness on the PVDF surface and causes the formation of a network of pores, which permits the incompatible polymer to become attached to the PVDF material.

The PVDF particles can be attached to the PVDF material surface according to any method. One of the preferred methods consists of sputtering powdered PVDF through a torch flame and onto the preferably preheated PVDF surface. The particles, whose surface has partially melted, will fuse together on the PVDF material surface to be treated. Another method consists of coating the PVDF surface to be treated with a hot solvent at a temperature preferably between 130° C. and 165° C. To prevent excessively rapid evaporation of the solvent with the latter method, the solvent is preferably replaced with PVDF solution in the hot solvent, preferably with a concentration ranging from 1 to 20 wt. %. As previously, the surface to be treated is coated with solution before the PVDF particles are sprayed on. To increase the thickness of the adhesion-enhancing layer, it is possible to repeat the entire set of operations after the first surface treatment of the PVDF material at least once.

Another preferred method consists of producing a porous cloth formed by powder particles bonded to one another from PVDF particles. This cloth is subsequently attached to a surface of a PVDF product, such as a PVDF plate or sheet; the cloth may be attached by any known method, e.g., by gluing with a PVDF solvent or preferably by hot rolling.

More specifically, the porous cloth can be prepared by depositing powder on an inert and preferably metallic support, e.g., by dusting. The assembly is brought to a temperature higher than the melting point of the PVDF for a period of time sufficient to permit interfacial bonding of the powder particles. In general, the powder is heated at a temperature of 180-200° C. for a period of time ranging from 30 seconds to five minutes.

Under these conditions, a fritted PVDF cloth with a porous texture is obtained. The thickness of this cloth is, in general, between 0.4 and 1 mm.

After recovery, this cloth is attached to a PVDF surface. The attachment can be performed by simple gluing, but this cloth is preferably attached to a PVDF plate or sheet as it leaves an extruder. For example, on leaving the extruder in the form of a plate or sheet, the surface of the PVDF is still in a practically molten state at the lips of the extrusion head, and the cloth is applied to one of the surfaces and is fixed by pressure, e.g., by calendering, before cooling of the PVDF plate or sheet. The cloth is fixed preferably at a sheet or plate temperature between 200° C. and 230° C. An intimate bond is thus obtained between the cloth and the PVDF product.

The PVDF particles used to coat the PVDF material surface are preferably PVDF homopolymers or copolymers containing at least 50 mol. % repeat units derived from vinylidene fluoride.

The PVDF material treated according to the present invention is characterized by a high degree of adhesion to the polymers that are incompatible with PVDF. Thus, it is possible to directly crosslink the incompatible polymer, such as thermosetting resins, e.g., polyester, on the PVDF particle surface, without any intermediate between the PVDF and the polymer. It is also possible to adhere, under pressure and in the hot state, an incompatible thermoplastic polymer directly by contact with the PVDF particle surface. Finally, it it also possible to directly adhere an incompatible polymer to the treated surface of the PVDF material using a polymer solution in a solvent.

The present invention is further illustrated by, but not limited to, the examples below.

EXAMPLE 1

A solution containing 10 wt. % PVDF in dimethylformamide is applied to an extruded PVDF plate preheated to 40° C., by means of a brush. A PVDF powder with a mean particle size of 90 microns is strewn on the coated surface. The assembly is heated to a temperature of 133° C. and maintained at this temperature for five minutes to evaporate the solvent. Using a torch, the treated surface is subsequently subjected to flame treatment to melt the surface of the PVDF powder particles without destroying the porous structure of the adhesion-enhancing surface. After cooling, a PVDF plate with a surface coated with a porous PVDF layer having a thickness of 270 microns is obtained.

A polyester resin is poured on the treated surface, after which successive layers of glass fiber mat and polyester are applied. After crosslinking, a PVDF-coated polyester laminate is obtained.

The adhesion measurements yielded the following results: shear strength 6.9 N/mm$^2$ at room temperature and 5.3 N/mm$^2$ at 80° C.

EXAMPLE 2

A 5 wt. % PVDF solution in dimethylformamide is sprayed onto an extruded PVDF plate, preheated to 50° C., by means of a spray gun. A PVDF powder identical to that described in Example 1 is sprayed onto the surface thus coated. Direct flame treatment is subsequently performed without previous heat treatment, which causes the dimethylformamide to ignite. After cooling, a PVDF plate coated with a porous PVDF layer is obtained. This adhesion-enhancing layer is subsequently subjected to corona treatment, after which the plate thus obtained is adhered to a sandblasted steel plate using a crosslinkable epoxy adhesive (AW 138, CIBA GEIGY).

The shear strength measurement of this structure yields a result of 6.4 N/mm$^2$ at room temperature.

EXAMPLE 3

A PVDF powder heated to 160° C., which is identical to that described in Example 1 above, is sprayed onto a PVDF plate molded by compression at 230° C. The temperature of the plate at the time of dusting is slightly lower than 230° C. The excess powder is removed with compressed air. The assembly is left to cool to room temperature. The assembly is subsequently adhered to a steel plate as in Example 2, and a shear strength of 4.5 N/mm$^2$ is obtained at room temperature.

EXAMPLE 4

At 5 wt. % solution of the copolymer VF$_2$—C$_2$F$_3$Cl is sprayed onto a stainless-steel plate; a PVDF powder identical to that described in Example 1 is subsequently sprayed on.

The assembly is placed into a furnace with a temperature of 150° C. for 1 minute 30 seconds to remove the solvent and then into a furnace with a temperature of 200° C. for 1 minute 30 seconds to melt the surface of the PVDF powder particles. After cooling, a resilient, porous PVDF cloth with a thickness of ca. 600 microns is obtained. This cloth is subsequently placed over a PVDF plate with a temperature of 210° C. after it has been preheated to 160° C.

After cooling the assembly, binding with polyester is performed as described in Example 1; shear strength obtained is 3.2 N/mm$^2$ at room temperature.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A polyvinylidene fluoride product having at least one surface with improved adhesion to an incompatible polymer, said at least one surface covered with a porous polyvinylidene fluoride layer adhered thereto without a bonding intermediate.

2. The product of claim 1, wherein the polyvinylidene fluoride layer is formed of polyvinylidene powder particles.

3. The product of claim 2, wherein powder particles have a mean particle size above about 50 microns.

4. The product of claim 3, wherein the powder attached to the surface forms a porous layer with a thickness between about 200 to 1,000 microns.

5. The product of claim 1, wherein the polyvinylidene fluoride layer is a resilient, porous polyvinylidene fluoride cloth.

6. A process for producing the product of anyone of claim 1 through 4, comprising attaching polyvinylidene fluoride particles in a bulk and dispersed form or a resilient, porous polyvinylidene fluoride cloth to a surface of a polyvinylidene fluoride product.

7. The process of claim 6, wherein powdered polyvinylidene fluoride is sprayed onto the surface of an optionally preheated polyvinylidene fluoride material through the flame of a torch.

8. The process of claim 6, wherein after coating the surface of a polyvinylidene fluoride solution in a hot solvent, polyvinylidene fluoride particles are sprayed on before the assembly heated to a temperature between 130° C. and 165° C.

9. The process of claim 6, wherein the cloth is attached to the product by adhesion using a solvent for polyvinylidene fluoride.

10. The process of claim 6, wherein the cloth is attached to a surface of polyvinylidene fluoride in a state in which its surface is essentially molten, and the assembly is cooled.

11. The process of claim 10, wherein the polyvinylidene fluoride surface is at a temperature between about 200° C. and 230° C.

12. The process of claim 11, wherein the cloth is first prepared by dusting an inert support with polyvinylidene fluoride powder, and the assembly is heated to a temperature that permits interfacial bonding of the powder particles to form the cloth.

13. The process of claim 12, wherein the powder is heated to a temperature between 180° C. and 200° C. for a period of time ranging from 30 seconds to five minutes to form the cloth.

14. The process of claims 12 or 13, wherein the thickness of the cloth is between 0.4 and 1 mm.

15. A laminate consisting essentially of the polyvinylidene fluoride product of any one of claims 1 to 8 having an incompatible polymer, as to adhesion to polyvinylidene fluoride, attached to said porous polyvinylidene fluoride layer.

* * * * *